(12) United States Patent
Kurizoe et al.

(10) Patent No.: US 12,153,192 B2
(45) Date of Patent: Nov. 26, 2024

(54) OPTICAL-WAVEGUIDE-CLAD COMPOSITION, OPTICAL-WAVEGUIDE-CLAD DRY FILM, AND OPTICAL WAVEGUIDE

(71) Applicant: PANASONIC INTELLECTUAL PROPERTY MANAGEMENT CO., LTD., Osaka (JP)

(72) Inventors: Junko Kurizoe, Osaka (JP); Toru Nakashiba, Osaka (JP); Shingo Maeda, Saga (JP); Naoyuki Kondo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 369 days.

(21) Appl. No.: 17/430,523

(22) PCT Filed: Feb. 19, 2020

(86) PCT No.: PCT/JP2020/006413
§ 371 (c)(1),
(2) Date: Aug. 12, 2021

(87) PCT Pub. No.: WO2020/171100
PCT Pub. Date: Aug. 27, 2020

(65) Prior Publication Data
US 2022/0128735 A1   Apr. 28, 2022

(30) Foreign Application Priority Data
Feb. 21, 2019   (JP) .................. 2019-029518

(51) Int. Cl.
*G02B 1/04*     (2006.01)
*C08G 59/22*    (2006.01)
(Continued)

(52) U.S. Cl.
CPC .............. *G02B 1/048* (2013.01); *C08L 63/00* (2013.01); *G02B 6/02033* (2013.01); *G02B 2006/12073* (2013.01)

(58) Field of Classification Search
CPC .... G02B 1/048; G02B 6/02033; G02B 6/122; G02B 6/13; G02B 2006/12073; C08L 63/00; C08G 59/226
See application file for complete search history.

(56) References Cited

U.S. PATENT DOCUMENTS 8,351,752 B2 * 1/2013 Shibata .................. G02B 6/138
                                                   385/132
2010/0150510 A1   6/2010 Sato et al.
(Continued)

FOREIGN PATENT DOCUMENTS

CN   102365330 A   2/2012
CN   108496101 A   9/2018
(Continued)

OTHER PUBLICATIONS

ISR for PCT/JP2020/006413, dated May 26, 2020 (w/ translation).

*Primary Examiner* — Ryan A Lepisto
*Assistant Examiner* — Erin D Chiem
(74) *Attorney, Agent, or Firm* — Greenblum & Bernstein, P.L.C.

(57) ABSTRACT

An optical-waveguide-clad composition includes a bisphenol type epoxy compound (A), and an epoxy compound (B) containing, in a molecule, at least one of a structure represented by the following formula (1) and a structure represented by the following formula (2), and having a molecular weight of 350 or higher.

(Continued)

[Chem. 1]

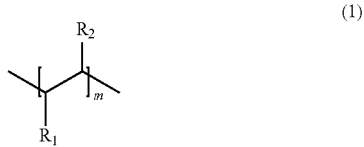

(1)

In the formula (1), $R_1$ and $R_2$ each independently represent a hydrogen atom or an alkyl group, and m represents 2 to 15.

[Chem. 2]

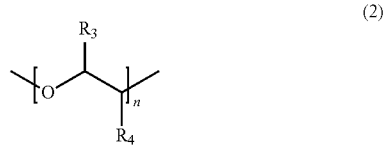

(2)

In the formula (2), $R_3$ and $R_4$ each independently represent a hydrogen atom or an alkyl group, and n represents 2 to 15.

6 Claims, 2 Drawing Sheets

(51) Int. Cl.
    *C08L 63/00*     (2006.01)
    *G02B 6/02*     (2006.01)
    *G02B 6/12*     (2006.01)
    *G02B 6/122*     (2006.01)
    *G02B 6/13*     (2006.01)

(56) References Cited

U.S. PATENT DOCUMENTS

| | | |
|---|---|---|
| 2012/0033913 A1 | 2/2012 | Kondou et al. |
| 2013/0236149 A1 | 9/2013 | Hirayama |
| 2021/0206962 A1 | 7/2021 | Hirayama et al. |

FOREIGN PATENT DOCUMENTS

| | | |
|---|---|---|
| CN | 109265916 A | 1/2019 |
| JP | 2013-186462 A | 9/2013 |
| JP | 2017-134319 A | 8/2017 |

\* cited by examiner

OPTICAL-WAVEGUIDE-CLAD COMPOSITION, OPTICAL-WAVEGUIDE-CLAD DRY FILM, AND OPTICAL WAVEGUIDE

TECHNICAL FIELD

The present invention relates to an optical-waveguide-clad composition, an optical-waveguide-clad dry film, and an optical waveguide.

BACKGROUND ART

High-speed transmission is required in the fields of middle-distance communication and long-distance communication, specifically, the fields of fiber to the home (FTTH), in-vehicle use, and the like, and in order to realize this, optical fiber cables have been used as a transmission medium. High-speed transmission has also been required in short-distance communication, for example, communication within a distance of 1 m. In the field of such short-distance communication, performances that are difficult to realize by an optical fiber cable are also required. Specific examples of the required performances include: high-density wiring such as narrow pitch, branching, crossing, and multilayering; surface mountability; capability of being integrated with an electrical wiring board; and capability of being bent with a small radius of curvature. In order to meet these requirements, it is conceivable to use an optical wiring board including an optical waveguide.

In order to use light input and output from the optical waveguide, it is preferable to mount, on such an optical wiring board, photoelectric conversion elements including a light emitting element such as a vertical cavity surface emitting laser (VCSEL), and a light receiving element such as a photo diode (PD), a semiconductor element such as an integrated circuit (IC), and the like. In order to drive these elements, it is necessary to provide electric wiring on the optical wiring board and the like. For this reason, a photoelectric composite wiring board is preferable in which not only an optical waveguide but also electric wiring are provided on a substrate.

Examples of the optical waveguide include an optical waveguide made of a resin material, that is, a polymer optical waveguide. As the optical waveguide to be provided in the photoelectric composite wiring board, a polymer optical waveguide is preferably used also from the viewpoint of compatibility with a wiring board provided with an electric circuit.

Examples of the material of such an optical waveguide include epoxy resin compositions described in Patent Literature 1.

Patent Literature 1 describes an epoxy resin composition for forming an optical waveguide that contains a liquid epoxy resin having a predetermined structure, a solid resin, and a photoacid generator. Patent Literature 1 discloses that when a clad or core, for example, of an optical waveguide is formed using this epoxy resin composition for forming an optical waveguide, high Tg, high flexibility, and patterning properties are exhibited.

Optical wiring boards have been required to correspond to shorter distances, higher densities, and the like, as represented by silicon photonics in which light emitting and receiving elements are integrated on silicon. In order to meet this requirement, fine wiring by bringing an optical waveguide to a single mode is also required. For these reasons and the like, fine wiring of an optical waveguide has been increasingly required.

When an optical waveguide is formed using a conventional material of an optical waveguide, for example, the epoxy resin composition described in Patent Literature 1, cracks may occur in a place of a clad around a core, where stress concentrates. Furthermore, in a case where fine wiring and the like as described above are formed, cracks are more likely to occur in the clad.

CITATION LIST

Patent Literature

Patent Literature 1: JP 2013-186462 A

SUMMARY OF INVENTION

The present invention has been made in view of such circumstances, and an object of the present invention is to provide an optical-waveguide-clad composition and an optical-waveguide-clad dry film that can manufacture an optical waveguide clad having high tear strength and excellent crack resistance. Another object of the present invention is to provide an optical waveguide including a clad having high tear strength and excellent crack resistance.

An aspect of the present invention is an optical-waveguide-clad composition including a bisphenol type epoxy compound (A), and an epoxy compound (B) containing, in a molecule, at least one of a structure represented by the following formula (1) and a structure represented by the following formula (2), and having a molecular weight of 350 or higher.

[Chem. 1]

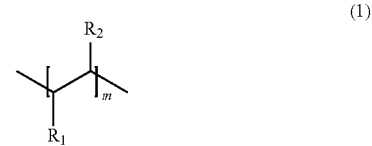

(1)

In the formula (1), $R_1$ and $R_2$ each independently represent a hydrogen atom or an alkyl group, and m represents 2 to 15.

[Chem. 2]

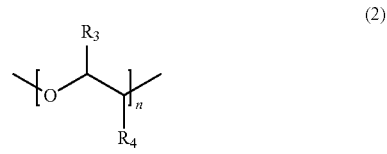

(2)

In the formula (2), $R_3$ and $R_4$ each independently represent a hydrogen atom or an alkyl group, and n represents 2 to 15.

DESCRIPTION OF EMBODIMENTS

Figure 1:
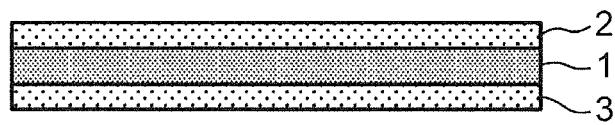
FIG. 1 is a cross-sectional view showing a configuration of an optical-waveguide-clad dry film according to an embodiment of the present invention.

As a result of various studies, the present inventors have found that the above object of providing an optical-waveguide-clad composition that can manufacture an optical waveguide clad having high tear strength and excellent crack resistance is achieved by the following present invention. Specifically, the present inventors have found that when a composition for manufacturing an optical waveguide clad contains, in the molecule, an epoxy compound having a flexible structure as described later, its cured product is difficult to tear apart and an optical waveguide clad having high tear strength and excellent crack resistance can be manufactured.

Hereinafter, embodiments according to the present invention will be described, but the present invention is not limited thereto.

Optical-Waveguide-Clad Composition

An optical-waveguide-clad composition according to an embodiment of the present invention is an optical-waveguide-clad composition including a bisphenol type epoxy compound (A), and an epoxy compound (B) containing, in the molecule, at least one of the structure represented by the following formula (1) and the structure represented by the following formula (2), and having a molecular weight of 350 or higher:

[Chem. 3]

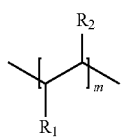

(1)

In the formula (1), $R_1$ and $R_2$ each independently represent a hydrogen atom or an alkyl group, and m represents 2 to 15.

[Chem. 4]

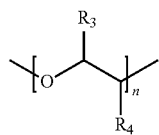

(2)

In the formula (2), $R_3$ and $R_4$ each independently represent a hydrogen atom or an alkyl group, and n represents 2 to 15.

The optical-waveguide-clad composition can manufacture an optical waveguide clad having high tear strength and excellent crack resistance. This is considered to be due to the fact that both the structure represented by the formula (1) and the structure represented by the formula (2) have flexibility. Both the structure represented by the formula (1) and the structure represented by the formula (2) are considered to be stretchable structures, and a cured product of the optical-waveguide-clad composition containing the epoxy compound (B) having, in the molecule, at least one of these structures can absorb stress by the stretchable structures when subjected to the stress, so that it is considered that the tear strength is improved. From this, a clad containing the cured product of the optical-waveguide-clad composition has high tear strength, so that it is considered that occurrence of cracks in a place of the clad, where stress concentrates, is sufficiently suppressed. Therefore, the optical-waveguide-clad composition is considered to be an optical-waveguide-clad composition that can manufacture an optical waveguide clad having high tear strength and excellent crack resistance.

The bisphenol type epoxy compound (A) is not particularly limited as long as it is a bisphenol type epoxy compound, and examples thereof include epoxy compounds manufactured using bisphenols such as, for example, bisphenol A, bisphenol F, bisphenol B, bisphenol E, and bisphenol S. That is, specific examples of the bisphenol type epoxy compound (A) include bisphenol A type epoxy compounds, bisphenol F type epoxy compounds, bisphenol B type epoxy compounds, bisphenol E type epoxy compounds, bisphenol S type epoxy compounds, bisphenol A novolac type epoxy compounds, bisphenol F novolac type epoxy compounds, bisphenol B novolac type epoxy compounds, bisphenol E novolac type epoxy compounds, and bisphenol S novolac type epoxy compounds. The bisphenol type epoxy compound (A) may be a liquid compound (for example, a liquid bisphenol A type epoxy compound or the like) or a solid compound (for example, a solid bisphenol A type epoxy compound or the like). The bisphenol type epoxy compound (A) may be a hydrogenated compound. The bisphenol type epoxy compound (A) also includes an epoxy resin that is a polymer of each of the epoxy compounds.

Examples of the solid bisphenol A type epoxy compound include 1001, 1002, 1003, 1055, 1004, 1004AF, 1003F, 1004F, 1005F, 1004FS, 1006FS, and 1007FS manufactured by Mitsubishi Chemical Corporation.

Examples of the liquid bisphenol A type epoxy compound include 825, 827, and 828 manufactured by Mitsubishi Chemical Corporation, and 840, 850, and 850S manufactured by DIC Corporation.

Examples of the solid hydrogenated bisphenol A type epoxy compound include YX8000, YX8034, YX8040, and YL7170 that are hydrogenated bisphenol A type epoxy resins manufactured by Mitsubishi Chemical Corporation, and ST-3000 and ST-4000D manufactured by NIPPON STEEL Chemical & Material Co., Ltd.

Examples of the liquid hydrogenated bisphenol A type epoxy compound include YX8000 manufactured by Mitsubishi Chemical Corporation.

Examples of the liquid bisphenol F type epoxy compound include 830S manufactured by DIC Corporation.

Examples of the solid bisphenol F type epoxy compound include 4007 manufactured by Mitsubishi Chemical Corporation.

As the bisphenol type epoxy compound (A), the above exemplary bisphenol type epoxy compounds (A) may be used alone, or two or more kinds thereof may be used in combination.

The content of the bisphenol type epoxy compound (A) is preferably 50 parts by mass or more and 90 parts by mass or less, and more preferably 65 parts by mass or more and 80 parts by mass or less, based on 100 parts by mass of all epoxy compounds (all epoxy compounds including the bisphenol type epoxy compound (A), the epoxy compound (B), and another epoxy compound to be described later) contained in the optical-waveguide-clad composition. If the content of the bisphenol type epoxy compound (A) is too small, the content of the epoxy compound (B) becomes relatively large, and the crosslinking density of the entire material decreases. Thus, the glass transition temperature (Tg) tends to be low. Conversely, if the content of the bisphenol type epoxy compound (A) is too large, the content of the epoxy compound (B) becomes relatively small, so that there is a tendency that the effect of containing the epoxy compound (B), that is, the effect of being able to manufacture an optical waveguide clad having high tear strength and excellent crack resistance cannot be sufficiently exhibited.

The bisphenol type epoxy compound (A) preferably has a molecular weight in a range of 1000 or higher to 5000 or lower. If the molecular weight of the bisphenol type epoxy compound (A) is too high, the Tg (glass transition temperature) of the cured resin composition tends to be too low. Thus, this level is preferable from the viewpoint of developability.

The epoxy compound (B) is not particularly limited as long as it contains, in the molecule, at least one of the structure represented by the formula (1) and the structure represented by the formula (2), and has a molecular weight of 350 or higher. The epoxy compound (B) also includes an epoxy resin that is a polymer of each of the epoxy compounds.

The molecular weight of the epoxy compound (B) is 350 or higher, preferably 350 to 2400, more preferably 600 to 2400, and still more preferably 700 to 2000. If the molecular weight of the epoxy compound (B) is too low, the crosslinking density of the entire material increases, and the flexibility tends to be impaired. It is preferable that the epoxy compound (B) has a higher molecular weight, but if the molecular weight is too high, the crosslinking density of the entire material decreases, so that the glass transition temperature (Tg) tends to be too low. Thus, the molecular weight is preferably 2400 or lower. Therefore, when the molecular weight of the epoxy compound (B) is within the above range, an optical-waveguide-clad composition that can manufacture an optical waveguide clad having high tear strength and excellent crack resistance is obtained. Here, when the epoxy compound (B) is an epoxy resin, the molecular weight refers to, for example, a weight average molecular weight. Here, the weight average molecular weight can be specifically measured using, for example, gel permeation chromatography (GPC) or the like.

In the formula (1), m represents the number of repetitions (polymerization degree) of the structure represented by the formula (1), m being 2 to 15 at which the molecular weight of the epoxy compound (B) is 350 or higher. As described above, m is 2 to 15, preferably 3 to 13, and more preferably 4 to 10. In the formula (2), n represents the number of repetitions (polymerization degree) of the structure represented by the formula (1), n being 2 to 15 at which the molecular weight of the epoxy compound (B) is 350 or higher. As described above, n is 2 to 15, preferably 3 to 13, and more preferably 4 to 10. When the epoxy compound (B) contains, in the molecule, both the structure represented by the formula (1) and the structure represented by the formula (2), the total of m and n is preferably 2 to 15, more preferably 3 to 13, and still more preferably 4 to 10. If m, n, and the total of m and n are too small, the average molecular weight tends to be too low, and in this case, the crosslinking density of the entire material increases. Thus, the flexibility tends to be impaired. Conversely, if m, n, and the total of m and n are too large, the average molecular weight tends to be too high, and in this case, the crosslinking density of the entire material decreases. Thus, the glass transition temperature (Tg) tends to be too low.

The alkyl groups represented by $R_1$ and $R_2$ in the formula (1) and $R_3$ and $R_4$ in the formula (2) are not particularly limited. The alkyl group is preferably an alkyl group having 1 to 5 carbon atoms, and more preferably an alkyl group having 1 to 3 carbon atoms. More specific examples of the alkyl group include a methyl group, an ethyl group, and a propyl group. $R_1$ and $R_2$ in the formula (1) and $R_3$ and $R_4$ in the formula (2) are each the alkyl group or a hydrogen atom. Among them, a hydrogen atom is preferable.

The epoxy compound (B) preferably has an epoxy equivalent of 200 to 1200 g/eq, and more preferably 300 to 1100 g/eq. When the epoxy equivalent is too small or too large, it tends to be difficult to form an optical waveguide clad. Specifically, if the epoxy equivalent is too small, it tends to be difficult to form a dry film. Conversely, if the epoxy equivalent is too large, the developability becomes poor, and it tends to be difficult to properly perform the development at the time of forming the optical waveguide clad. From these, when the epoxy equivalent of the epoxy compound (B) is within the above range, the optical waveguide clad can be properly formed. An epoxy equivalent is a molecular weight per epoxy group, and is approximated to a value obtained by dividing a molecular weight by the number of epoxy groups in a molecule.

As described above, the epoxy compound (B) is only required to contain, in the molecule, at least one of the structure represented by the formula (1) and the structure represented by the formula (2), and preferably further contains, in the molecule, a more rigid structure than the structure represented by the formula (1) and the structure represented by the formula (2). The rigid structure is not particularly limited as long as it is a more rigid structure than the structure represented by the formula (1) and the structure represented by the formula (2). Examples thereof include a structure in which two benzene rings, for example, are bonded via one carbon atom.

Examples of the rigid structure include a structure in which two benzene rings are bonded via a methylene group, a methylmethylene group, a dimethylmethylene group, or the like.

Examples of the epoxy compound (B) include epoxy compounds represented by the following formulae (3) to (8).

[Chem. 5]

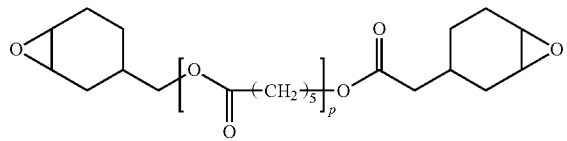

(3)

In the formula (3), p represents 1 to 10.

[Chem. 6]

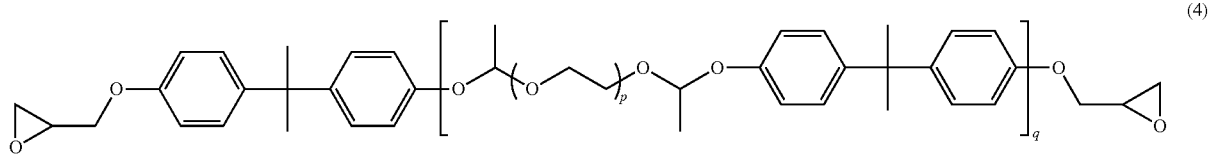

(4)

In the formula (4), p represents 1 to 15, and q represents 1 to 5.

[Chem. 7]

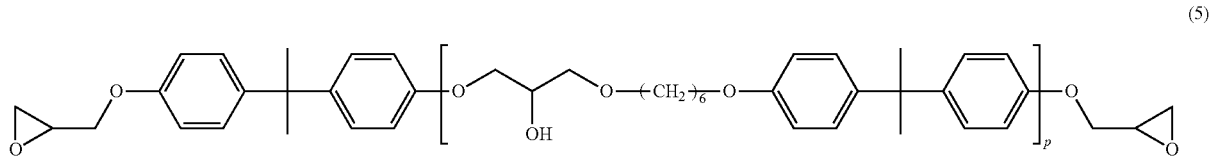

(5)

In the formula (5), p represents 1 to 5.

[Chem. 8]

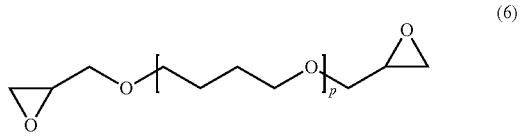

(6)

In the formula (6), p represents 1 to 15.

[Chem. 9]

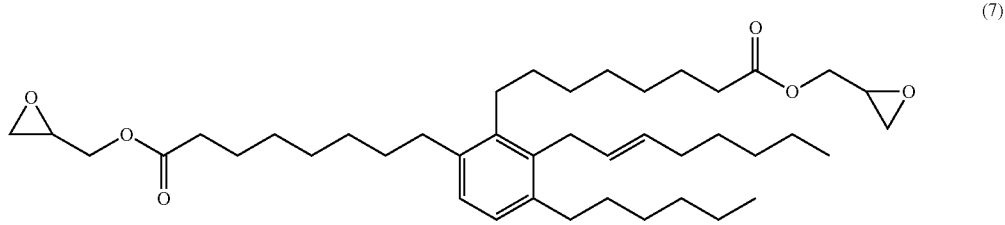

(7)

[Chem. 10]

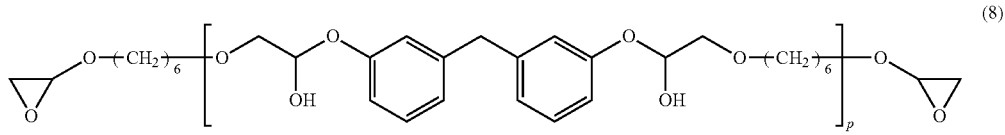

(8)

In the formula (8), p represents 5 to 10.

As the epoxy compound (B), the above exemplary epoxy compounds (B) may be used alone, or two or more kinds thereof may be used in combination.

The content of the epoxy compound (B) is preferably 5 parts by mass or more and 30 parts by mass or less, and more preferably 8 parts by mass or more and 23 parts by mass or less, based on 100 parts by mass of all the epoxy compounds (all the epoxy compounds including the bisphenol type epoxy compound (A), the epoxy compound (B), and another epoxy compound to be described later) contained in the optical-waveguide-clad composition. If the content of the epoxy compound (B) is too small, there is a tendency that the effect of containing the epoxy compound (B), that is, the effect of being able to manufacture an optical waveguide clad having high tear strength and excellent crack resistance cannot be sufficiently exhibited. Conversely, if the content of the epoxy compound (B) is too large, the crosslinking density of the entire material decreases, and the glass transition temperature (Tg) tends to be low.

The optical-waveguide-clad composition may contain components (other components) other than the bisphenol type epoxy compound (A) and the epoxy compound (B) as long as the composition contains the bisphenol type epoxy compound (A) and the epoxy compound (B). Examples of the other component include an epoxy compound (another epoxy compound) other than the bisphenol type epoxy compound (A) and the epoxy compound (B), and a curing agent.

The other epoxy compound is not particularly limited as long as it is an epoxy compound (an epoxy compound that is not a bisphenol type epoxy compound and contains, in the molecule, neither the structure represented by the formula (1) nor the structure represented by the formula (2), or an epoxy compound that is not a bisphenol type epoxy compound and has a molecular weight of lower than 350) other than the bisphenol type epoxy compound (A) and the epoxy compound (B). Examples of the other epoxy compound include liquid and aliphatic epoxy compounds (liquid aliphatic epoxy compounds), aromatic epoxy compounds having, in the molecule, three or more epoxy groups (polyfunctional aromatic epoxy compounds), phenol novolac type epoxy compounds, cresol novolac type epoxy compounds, solid alicyclic epoxy compounds, and solid aliphatic epoxy compounds having, in the molecule, two or more epoxy groups.

Specific examples of the liquid aliphatic epoxy compound include 3,4-epoxycyclohexylmethyl(3,4-epoxy)cyclohexanecarboxylate, and trimethylolpropane polyglycidyl ether. Examples of the 3,4-epoxycyclohexylmethyl(3,4-epoxy)cyclohexanecarboxylate include CELLOXIDE 2021P manufactured by DAICEL CORPORATION. Examples of the trimethylolpropane polyglycidyl ether include YH-300 manufactured by NIPPON STEEL Chemical & Material Co., Ltd., and EX-321L manufactured by Nagase ChemteX Corporation.

Specific examples of the polyfunctional aromatic epoxy compound include 2-[4-(2,3-epoxypropoxy)phenyl]-2-[4-[1,1-bis[4-([2,3-epoxypropoxy]phenyl)ethyl]phenyl]propane. Examples of this compound include VG3101 manufactured by PRINTEC CORPORATION.

Examples of the phenol novolac type epoxy compound include N-740, N-770, and N-775 manufactured by DIC Corporation, and EPPN-501H, EPPN-502H, EPPN-201, and BREN-S manufactured by Nippon Kayaku Co., Ltd.

Examples of the cresol novolac type epoxy compound include EOCN-4600 manufactured by Nippon Kayaku Co., Ltd.

The solid alicyclic epoxy compound has, in the molecule, three or more epoxy groups, and examples thereof include a 1,2-epoxy-4-(2-oxiranyl)cyclohexane adduct of 2,2-bis(hydroxymethyl)-1-butanol. Examples of this compound include EHPE3150 manufactured by DAICEL CORPORATION.

Examples of the solid aliphatic epoxy compound include a solid and aliphatic epoxy compound having, in the molecule, two or more epoxy groups.

As the other epoxy compound, the above exemplary compounds may be used alone, or two or more kinds thereof may be used in combination.

The content of the other epoxy compound is preferably 5 parts by mass or more and 20 parts by mass or less, and more preferably 5 parts by mass or more and 15 parts by mass or less, based on 100 parts by mass of all the epoxy compounds (all the epoxy compounds including the bisphenol type epoxy compound (A), the epoxy compound (B), and the other epoxy compound) contained in the optical-waveguide-clad composition. If the content of the other epoxy compound is too small, the glass transition temperature (Tg) decreases, or the melt viscosity of an uncured film decreases. Thus, handleability tends to be impaired. Conversely, if the content of the other epoxy compound is too large, the content of the epoxy compound may become too small, and in this case, there is a tendency that the effect of containing the epoxy compound, that is, the effect of being able to manufacture an optical waveguide clad having high tear strength and excellent crack resistance cannot be sufficiently exhibited.

The curing agent is not particularly limited as long as it can promote the curing of the composition containing the bisphenol type epoxy compound (A) and the epoxy compound (B). Examples of the curing agent include a photo-curing agent that can promote, by light, the curing of the composition containing the bisphenol type epoxy compound (A) and the epoxy compound (B). Examples of the photo-curing agent include a photo-cationic curing agent and a photo-anionic curing agent.

The photo-cationic curing agent is a polymerization initiator for ring-opening polymerization of an epoxy group of each of the epoxy compounds, and is a compound that can initiate a reaction by light. As the photo-cationic curing agent, for example, CPI-100P, CPI-101A, and CPI-200K manufactured by San-Apro Ltd, SP-170 manufactured by ADEKA Corporation, B2380, C1390, D2238, D2960, I0591, M1209, N0137, and T1608 manufactured by Wako Pure Chemical Industries, Ltd., and the like can be used.

The photo-anionic curing agent is a polymerization initiator for ring-opening polymerization of an epoxy group of each of the epoxy compounds, and is a compound that can initiate a reaction by light. As the photo-anionic curing agent, for example, A2502, N0528, O0396 manufactured by Wako Pure Chemical Industries, Ltd., and the like can be used.

As the curing agent, the above exemplary compounds may be used alone, or two or more kinds thereof may be used in combination.

The content of the curing agent is preferably 0.1 parts by mass or more and 3 parts by mass or less, and more preferably 0.4 parts by mass or more and 1.5 parts by mass or less, based on 100 parts by mass of all the epoxy compounds (all the epoxy compounds including the bisphenol type epoxy compound (A), the epoxy compound (B), and the other epoxy compound) contained in the optical-waveguide-clad composition. If the content of the curing agent is too small, the optical-waveguide-clad composition tends to be difficult to cure. Conversely, if the content of the curing agent is too large, cations or anions tend to be excessively generated. For this reason, for example, the optical-waveguide-clad composition is excessively easily cured. Thus, there are tendencies that the preservability of the optical-waveguide-clad composition deteriorates or the handleability thereof deteriorates.

The optical-waveguide-clad composition may contain an antioxidant. From the viewpoint of enhancing heat resistance, it is preferable to contain an antioxidant. The antioxidant is not particularly limited, and a phenol-based antioxidant, a phosphite-based antioxidant, a sulfur-based antioxidant, or the like can be used. Examples of the phenol-based antioxidant include AO-20, AO-30, AO-40, AO-50, AO-60, and AO-80 manufactured by ADEKA Corporation, and SUMILIZER GA-80 manufactured by Sumitomo Chemical Co., Ltd. Examples of the phosphite-based antioxidant include PEP-8, PEP-36, HP-10, 2112, 1178, and 1500 manufactured by ADEKA Corporation, and JP-360 and JP-3CP manufactured by JOHOKU CHEMICAL Co., Ltd. Examples of the sulfur-based antioxidant include AO-412S and AO-503 manufactured by ADEKA Corporation, and SUMILIZER TP-D manufactured by Sumitomo Chemical Co., Ltd. As the antioxidant, the above exemplary compounds may be used alone, or two or more kinds thereof may be used in combination.

The optical-waveguide-clad composition is preferable when the cured product thereof has a tear strength of 60 N/mm or higher, and more preferable when the cured product has a tear strength of 80 N/mm or higher. The higher the tear strength, the more preferable it is, but in practice, the limit is about 100 N/mm. Therefore, the tear strength is preferably 60 to 100 N/mm, and more preferably 80 to 100 N/mm. When the tear strength of the cured product of the optical-waveguide-clad composition is as high as described above, the crack resistance of an optical waveguide clad manufactured using the optical-waveguide-clad composition is sufficiently enhanced. Therefore, when the tear strength of the cured product of the optical-waveguide-clad composition is within the above range, an optical-waveguide-clad composition that can manufacture an optical waveguide clad having higher tear strength and more excellent crack resistance is obtained. The tear strength can be measured by a method in accordance with JIS K 7128-3: 1998.

The number of cycles until cracks are generated in the cured product of the optical-waveguide-clad composition is preferably 1000 cycles or more, more preferably 2000 cycles or more, with the steps of holding the cured product at −55° C. for 15 minutes, then raising the temperature to 125° C., holding the cured product at 125° C. for 15 minutes, and cooling the cured product to −55° C. as one cycle. The number of cycles is preferably larger, and it is more preferable that no crack is generated. Such an optical-waveguide-clad composition can manufacture an optical waveguide clad having higher tear strength and more excellent crack resistance.

As described above, the optical-waveguide-clad composition according to the present embodiment is a composition that can manufacture an optical waveguide clad having high tear strength and excellent crack resistance.

The optical-waveguide-clad composition can be used as a material of a dry film to be used for manufacturing an optical waveguide clad.

An optical-waveguide-clad dry film according to another embodiment of the present invention is not particularly limited as long as it includes a layer containing the optical-waveguide-clad composition. Specific examples of the optical-waveguide-clad dry film include a dry film in which a film substrate 2 is provided on one surface of an optical-waveguide-clad composition layer (layer containing the optical-waveguide-clad composition) 1, and a protective film 3 is provided on the other surface, as shown in FIG. 1. The optical-waveguide-clad dry film is only required to include the optical-waveguide-clad composition layer, and may include not only the film substrate and the protective film, but also other layers. FIG. 1 is a cross-sectional view showing a configuration of the optical-waveguide-clad dry film according to the present embodiment.

The film substrate is not particularly limited, and examples thereof include a polyethylene terephthalate (PET) film, a biaxially stretched polypropylene film, a polyethylene naphthalate film, and a polyimide film. Among them, a PET film is preferably used.

The protective film is not particularly limited, and examples thereof include a polypropylene film and the like.

A method for manufacturing the optical-waveguide-clad dry film is not particularly limited, and examples thereof include the following method and the like. First, a solvent and the like are added to the optical-waveguide-clad composition to form a varnish, which is coated onto the film substrate. Examples of the coating include coating using a comma coater or the like. Then, the varnish is dried to form the optical-waveguide-clad composition layer on the film substrate. Further, the protective film is laminated on the optical-waveguide-clad composition layer. Examples of the lamination method include a thermal lamination method.

Since the optical-waveguide-clad dry film includes the layer containing the optical-waveguide-clad composition, an optical waveguide clad having high tear strength and excellent crack resistance can be manufactured. The optical-waveguide-clad composition according to the present embodiment may not be used in the form of a dry film as described above, and may be used, for example, in the form of varnish.

An optical waveguide according to another embodiment of the present invention is an optical waveguide including a core and a clad that covers the core, in which the clad contains a cured product of the optical-waveguide-clad composition. Since such an optical waveguide includes a clad containing the cured product of the optical-waveguide-clad composition, the optical waveguide is an optical waveguide including a clad having high tear strength and excellent crack resistance. Therefore, according to such an optical waveguide, occurrence of cracks in the clad can be sufficiently suppressed.

A method for manufacturing the optical waveguide will be described with reference to FIGS. 2A to 2H. Here, a method for manufacturing a photoelectric composite wiring board including an optical waveguide will be described. FIGS. 2A to 2H show views for explaining a method for manufacturing a photoelectric composite wiring board including the optical waveguide according to the present embodiment.

Figure 2A:
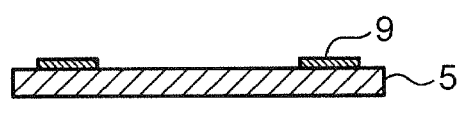
FIGS. 2A to 2H show views for explaining a method for manufacturing a photoelectric composite wiring board including an optical waveguide according to an embodiment of the present invention.
Figure 2B:
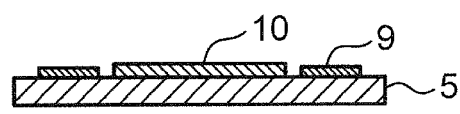
Figure 2C:
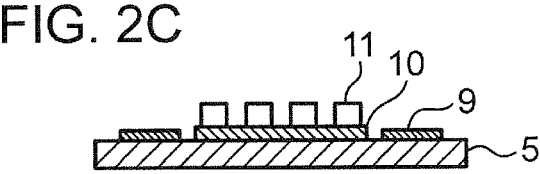

First, a substrate 5 including an electric circuit 9 is prepared as shown in FIG. 2A. Next, a lower clad layer 10 is formed on the surface, on which the electric circuit 9 is provided, of the substrate 5 using the optical-waveguide-clad dry film, as shown in FIG. 2B. Next, a core 11 is formed on the lower clad layer 10, as shown in FIG. 2C.

Figure 2D:
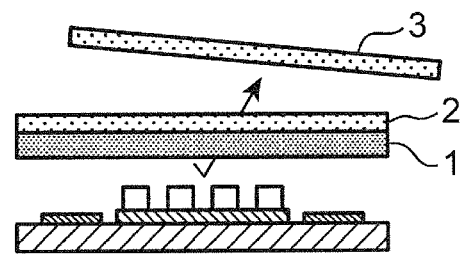
Figure 2E:
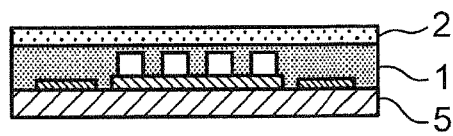
Figure 2F:
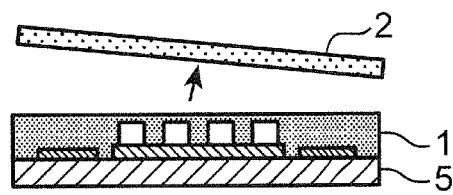
Figure 2G:
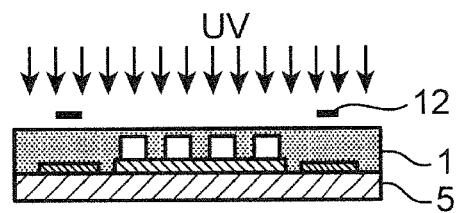

Next, an upper clad layer is formed using the optical-waveguide-clad dry film. Specifically, the protective film 3 is peeled off from the optical-waveguide-clad dry film, as shown in FIG. 2D. Thereafter, the peeled optical-waveguide-clad dry film is laminated such that the optical-waveguide-clad composition layer 1 covers the lower clad layer 10 and the core 11, as shown in FIG. 2E. Thereafter, the film substrate 2 is peeled off from the optical-waveguide-clad dry film, as shown in FIG. 2F. Next, the optical-waveguide-clad composition layer 1 is irradiated with ultraviolet rays to cure the optical-waveguide-clad composition, as shown in FIG. 2G. Thus, the optical-waveguide-clad composition layer 1 becomes the upper clad layer.

Figure 2H:
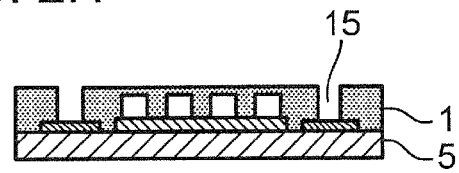

Note that a via 15 can be formed as shown in FIG. 2H by irradiating with ultraviolet rays via a mask 12, as shown in FIG. 2G, and then by performing development.

In the way described above, an optical waveguide including the core 11 and a clad that includes the upper clad layer 1 and the lower clad layer 10 can be formed using the optical-waveguide-clad dry film according to the present embodiment.

Hereinafter, the present invention will be further specifically described with reference to examples, but the scope of the present invention is not limited thereto.

EXAMPLES

First, the materials used in the present examples are summarized below.

Epoxy Compound

2021P: epoxy compound represented by the following formula (9) (2021P manufactured by DAICEL CORPORATION, molecular weight: 280, epoxy equivalent: 137 g/eq)

[Chem. 11]

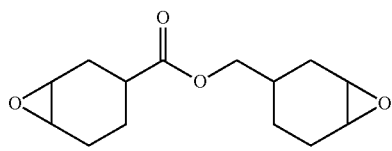

(9)

2081: epoxy compound represented by the formula (3) (2081 manufactured by DAICEL CORPORATION, molecular weight: 400, epoxy equivalent: 200 g/eq)

EXA4850-150: epoxy compound represented by the formula (4) (EXA4850-150 manufactured by DIC Corporation, molecular weight: 900, epoxy equivalent: 450 g/eq)

EXA4850-1000: epoxy compound represented by the formula (4) (EXA4850-1000 manufactured by DIC Corporation, molecular weight: 700, epoxy equivalent: 350 g/eq)

EXA4816: epoxy compound represented by the formula (5) (EXA4816 manufactured by DIC Corporation, molecular weight: 810, epoxy equivalent: 403 g/eq)

YX7400: epoxy compound represented by the formula (6) (YX7400 manufactured by Mitsubishi Chemical Corporation, molecular weight: 880, epoxy equivalent: 440 g/eq)

JER871: epoxy compound represented by the formula (7) (JER871 manufactured by Mitsubishi Chemical Corporation, molecular weight: 670, epoxy equivalent: 421 g/eq)

YX7110: epoxy compound represented by the formula (8) (YX7110 manufactured by Mitsubishi Chemical Corporation, molecular weight: 2300, epoxy equivalent: 1124 g/eq, solid)

850S: liquid bisphenol A type epoxy compound (850S manufactured by DIC Corporation)

VG3101: trifunctional aromatic epoxy compound (VG3101 manufactured by PRINTEC CORPORATION)

YX8040: solid hydrogenated bisphenol A type epoxy compound (YX8040 manufactured by Mitsubishi Chemical Corporation)

1006FS: solid bisphenol A type epoxy compound (1006FS manufactured by Mitsubishi Chemical Corporation)

Curing Agent

Curing agent: photo-cationic curing agent (CPI-101A manufactured by San-Apro Ltd.)

Examples 1 to 7, Comparative Example

Each composition according to Examples 1 to 7 and Comparative Example was prepared as follows.

First, each material was weighed in a glass container so as to have the compositions (parts by mass) shown in Table 1, and 2-butanone and toluene were added as solvents. The mixture was stirred under reflux at 80° C. Thus, a uniform varnish-like composition in which all the dissolvable solid contents were dissolved was obtained. The obtained varnish-like composition was filtered through a membrane filter made of polytetrafluoroethylene (PTFE) and having a pore size of 1 μm. Thus, the solid foreign matter contained was removed. Hereinafter, the filtered varnish-like composition was used.

Hereinafter, the obtained compositions were evaluated as follows.

Tear Strength

The tear strength of the cured product of each of the obtained compositions was measured by a method in accordance with JIS K 7128-3: 1998.

The results are shown in Table 1 together with the compositions.

TABLE 1

| | | Example 1 | Example 2 | Example 3 | Example 4 | Example 5 | Example 6 | Example 7 | Comparative Example |
|---|---|---|---|---|---|---|---|---|---|
| Composition (parts by mass) | 2021P | — | — | — | — | — | — | — | 14 |
| | 2081 | 8 | 8 | 8 | 8 | 8 | 8 | — | — |
| | EXA4850-150 | — | — | — | 15 | — | — | — | — |
| | EXA4850-1000 | 15 | — | — | — | — | — | 15 | — |
| | EXA4816 | — | 15 | — | — | — | — | — | — |
| | YX7400 | — | — | — | — | 15 | — | — | — |
| | JER871 | — | — | — | — | — | 15 | — | — |
| | YX 7110 | — | — | 15 | — | — | — | — | — |
| | 850S | — | — | — | — | — | — | 15 | — |
| | VG3101 | — | — | — | — | — | — | — | 23 |
| | YX8040 | 40 | 40 | 40 | 40 | 40 | 40 | 46 | 38 |
| | 1006FS | 37 | 37 | 37 | 37 | 37 | 37 | 24 | 25 |
| | Curing agent | 1 | 1 | 1 | 1 | 1 | 1 | 1 | 1 |
| Tear strength (N/mm) | | 98 | 89 | 83 | 91 | 72 | 66 | 78 | 58 |

As can be seen from Table 1, in the case of the compositions (Examples 1 to 7) each containing the bisphenol type epoxy compound (A) and the epoxy compound (B) (specifically, at least any one of the epoxy compounds represented by the formulae (3) to (8)) containing, in the molecule, at least one of the structure represented by the formula (1) and the structure represented by the following formula (2), and having a molecular weight of 350 or higher, the tear strength of the cured product was higher than that of the cured product of a composition (Comparative Example) not containing the epoxy compound (B). Therefore, it is considered that when a clad is manufactured using each of the compositions according to Examples 1 to 7, occurrence of cracks can be sufficiently suppressed.

Next, optical waveguides were produced using the compositions according to Examples 1, 6 and Comparative Example.

Specifically, the obtained varnish-like composition was coated onto a PET film (A4100 manufactured by TOYOBO Co., Ltd.) as a film substrate using a multi-coater with a comma coater head manufactured by HIRANO TECHSEED Co., Ltd., so that a layer containing the composition had a thickness of 25 μm. Then, it was dried at 125° C. Thus, a layer having a thickness of 25 µm and containing the composition was formed on the PET film. An oriented polypropylene film as a protective film was thermally laminated on the layer containing this composition. Thus, a clad dry film was obtained.

The clad dry film was laminated by a vacuum laminator on a substrate (1515 W manufactured by Panasonic Corporation was used) with copper on both surfaces etched off. Then, it was irradiated with ultraviolet rays, and after the PET film of the substrate was peeled off, a heat treatment was performed at 140° C. to form an under clad (lower clad). Next, a core dry film having a thickness of 25 µm was laminated by a vacuum laminator on the surface of the under clad.

Then, an exposure mask having a width of 25 µm and a length of 50 mm and provided with a linear pattern of openings was superimposed on the surface of the laminated core dry film, which was irradiated with ultraviolet rays. Thereafter, a heat treatment was performed at 140° C. to obtain a core dry film whose exposed part was cured.

Then, a development treatment was performed using an aqueous flux cleaner (Pine Alpha ST-100SX manufactured by Arakawa Chemical Industries, Ltd.) to remove uncured portions of the core dry film, and air blowing and drying were performed to form a core.

Next, the clad dry film was laminated on the core by a vacuum laminator. Then, the clad dry film was cured by irradiating with ultraviolet rays and then heating at 140° C.

In the way described above, a substrate provided with an optical waveguide was obtained.

The steps of holding the substrate provided with the obtained optical waveguide at −55° C. for 15 minutes, then raising the temperature to 125° C., holding the substrate at 125° C. for 15 minutes, and cooling the substrate to −55° C. was repeated as one cycle.

As a result, in the case of the substrate provided with an optical waveguide obtained using the composition according to Example 1, cracks were not generated in the clad even after 1500 cycles or 2000 cycles. In the case of the substrate provided with an optical waveguide obtained using the composition according to Example 6, cracks were generated in the clad after 1500 cycles, but were not generated in the clad after 1000 cycles. On the other hand, in the case of the substrate provided with an optical waveguide obtained using the composition according to Comparative Example, cracks were generated in the clad even after 1000 cycles. From these results, it has been found that when the composition according to Examples whose cured product has high tear strength is used, an optical waveguide including a clad more excellent in crack resistance can be manufactured as compared with the case of using the composition according to Comparative Example whose cured product has low tear strength.

This application is based on Japanese Patent Application No. 2019-029518 filed on Feb. 21, 2019, the contents of which are included in the present application.

In order to express the present invention, the present invention has been appropriately and sufficiently described above through the embodiments with reference to the drawings, but it should be recognized that a person skilled in the art can easily modify and/or improve the above embodiments. Therefore, unless the modified or improved forms implemented by the person skilled in the art are at a level that departs from the scope of the rights of claims described in the claims, it is construed that the modified or improved forms are included in the scope of the rights of the claims.

INDUSTRIAL APPLICABILITY

According to the present invention, there are provided an optical-waveguide-clad composition and an optical-waveguide-clad dry film that can manufacture an optical waveguide clad having high tear strength and excellent crack resistance. Further, according to the present invention, there is provided an optical waveguide including a clad having high tear strength and excellent crack resistance.

The invention claimed is:
1. An optical-waveguide-clad composition comprising:
a bisphenol type epoxy compound (A); and
an epoxy compound (B) containing at least one epoxy compound represented by the following formulae (3) to (8), and having a molecular weight of 350 to 2400:

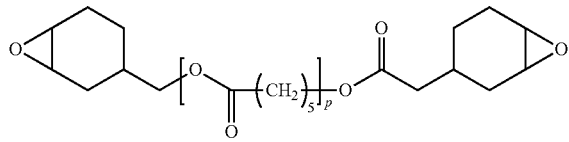

where: p represents 1 to 10,

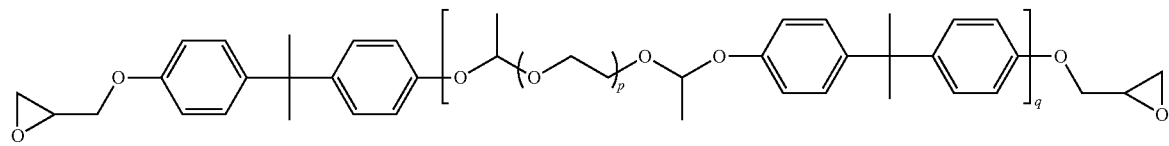

where: p represents 1 to 15, and q represents 1 to 5,

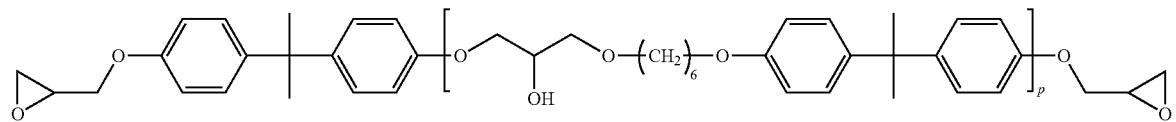

where: p represents 1 to 5,

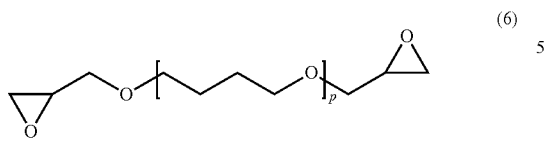

where: p represents 1 to 15,

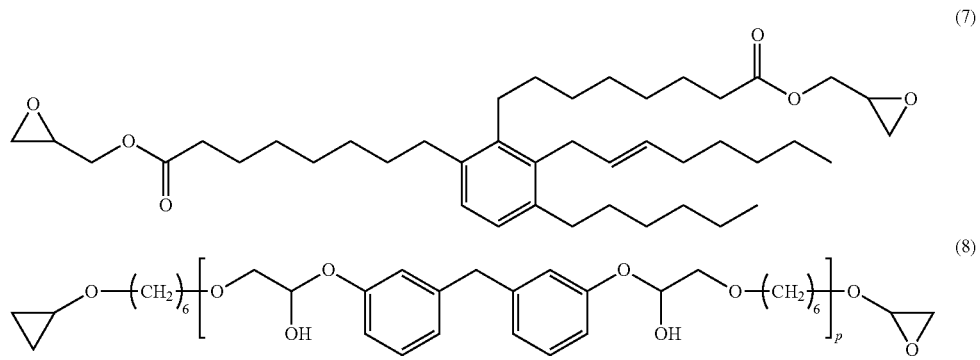

where: p represents 5 to 10.

2. The optical-waveguide-clad composition according to claim 1, wherein
a content of the bisphenol type epoxy compound (A) is 50 parts by mass or more and 90 parts by mass or less, based on 100 parts by mass of all epoxy compounds contained in the optical-waveguide-clad composition, and
a content of the epoxy compound (B) is 5 parts by mass or more and 30 parts by mass or less, based on 100 parts by mass of all the epoxy compounds contained in the optical-waveguide-clad composition.

3. The optical-waveguide-clad composition according to claim 1, wherein a cured product of the optical-waveguide-clad composition has a tear strength of 60 N/mm or higher.

4. The optical-waveguide-clad composition according to claim 1, wherein a number of cycles until a crack is generated in the cured product of the optical-waveguide-clad composition is 1000 cycles or more, with steps of holding the cured product at −55° C. for 15 minutes, then raising the temperature to 125° C., holding the cured product at 125° C. for 15 minutes, and cooling the cured product to −55° C. as one cycle.

5. An optical-waveguide-clad dry film comprising a layer containing the optical-waveguide-clad composition according to claim 1.

6. An optical waveguide comprising:
a core; and
a clad that covers the core,
wherein the clad contains a cured product of the optical-waveguide-clad composition according claim 1.

* * * * *